US009184901B2

(12) United States Patent
Fu

(10) Patent No.: US 9,184,901 B2
(45) Date of Patent: *Nov. 10, 2015

(54) METHOD AND APPARATUS FOR COMMUNICATING CARRIER CONFIGURATION IN MULTI-CARRIER OFDM SYSTEMS

(71) Applicant: MEDIATEK INC., Hsinchu (TW)

(72) Inventor: I-Kang Fu, Taipei (TW)

(73) Assignee: MEDIATEK INC. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/324,238

(22) Filed: Jul. 7, 2014

(65) Prior Publication Data

US 2014/0321386 A1    Oct. 30, 2014

Related U.S. Application Data

(63) Continuation of application No. 12/660,441, filed on Feb. 26, 2010, now Pat. No. 8,804,631.

(60) Provisional application No. 61/156,574, filed on Mar. 2, 2009, provisional application No. 61/172,344, filed on Apr. 24, 2009, provisional application No. 61/290,963, filed on Dec. 30, 2009.

(51) Int. Cl.
 *H04W 4/00* (2009.01)
 *H04L 5/00* (2006.01)
 (Continued)

(52) U.S. Cl.
 CPC ............ *H04L 5/0094* (2013.01); *H04L 5/0007* (2013.01); *H04L 5/0092* (2013.01); *H04W 48/08* (2013.01); *H04W 72/00* (2013.01); *H04W 72/0453* (2013.01)

(58) Field of Classification Search
 CPC ..................... H04W 72/0453; H04W 72/042
 USPC ........................................... 370/329
 See application file for complete search history.

(56) References Cited

U.S. PATENT DOCUMENTS

| 6,735,256 | B1 | 5/2004 | Toshimitsu | 375/260 |
|---|---|---|---|---|
| 7,002,974 | B1 | 2/2006 | Deerman et al. | 370/401 |

(Continued)

FOREIGN PATENT DOCUMENTS

| CN | 1794625 A | 12/2005 |
|---|---|---|
| CN | 101043499 A | 4/2006 |

(Continued)

OTHER PUBLICATIONS

The Taiwan IPO, Office Action of TW application 099105935 dated Jun. 24, 2014 (5 pages).

(Continued)

*Primary Examiner* — Mark Rinehart
*Assistant Examiner* — Matthew Hopkins
(74) *Attorney, Agent, or Firm* — Imperium Patent Works; Zheng Jin; Helen Mao

(57) ABSTRACT

A message contains global carrier configuration is provided in a wireless multi-carrier orthogonal frequency division multiplexing (OFDM) system. The global carrier configuration contains global carrier configuration information such as the center frequencies for multiple available RF carriers of different base stations in the OFDM network. In one embodiment, the global carrier configuration comprises information of single or multiple carrier groups, each carrier group comprises single or multiple contiguous RF carriers, and each carrier group is associated with a multi-carrier configuration index that refers to carrier configuration information contained in a carrier configuration lookup table and a frequency assignment index that refers to a global frequency location contained in a frequency assignment lookup table.

11 Claims, 10 Drawing Sheets

(51) Int. Cl.
*H04W 48/08* (2009.01)
*H04W 72/00* (2009.01)
*H04W 72/04* (2009.01)

(56) References Cited

U.S. PATENT DOCUMENTS

| | | | |
|---|---|---|---|
| 8,804,631 B2* | 8/2014 | Fu | 370/329 |
| 2008/0056195 A1* | 3/2008 | Lee et al. | 370/331 |
| 2008/0232316 A1* | 9/2008 | Cho et al. | 370/329 |
| 2008/0240275 A1 | 10/2008 | Cai | 375/260 |
| 2010/0035625 A1 | 2/2010 | Damnjanovic et al. | 455/450 |
| 2011/0159903 A1* | 6/2011 | Yuk et al. | 455/507 |
| 2011/0216730 A1 | 9/2011 | Kim et al. | 370/329 |
| 2012/0021792 A1 | 1/2012 | Shen et al. | 455/509 |

FOREIGN PATENT DOCUMENTS

| | | |
|---|---|---|
| CN | 101277145 A | 3/2007 |
| CN | 101345970 A | 7/2007 |
| JP | 2000102061 | 9/1998 |
| JP | 2003218825 | 1/2002 |
| JP | 2011530965 | 8/2008 |
| JP | 2012514913 | 1/2009 |
| WO | WO2010044627 | 10/2008 |

OTHER PUBLICATIONS

International Search Report and Written Opinion of International Search Authority for PCT/CN2010/070820 dated Jun. 10, 2010 (9 pages).
SIPO, the First Examination Opinion of the Chinese patent application 201080001033.8, dated Jun. 25, 2012(9 pages).
Japan Office Action for related JP application 2011-552313 dated Jan. 8, 2013 (11 pages).
3GPP TSG RAN WG1 Meeting #56, R1-090897, NTT DOCOMO, Initial Access Procedure for Asymmetric Wider Bandwidth in LTE-Advanced, Athens Greece, Feb. 9-13, 2009.
3GPP TSG RAN WG1 Meeting #54, R1-083015, NTT DOCOMO, Inc., Update Views on Support of Wider Bandwidth in LTE-Advanced, Jeju Korea, Aug. 18-22, 2008.
3GPP TSG RAN WG1 #55, R1-084194, LG Electronics, Proposals and Issues on the Carrier Aggregation and Control Signaling for LTE-A, Prague Czech, Nov. 10-14, 2008.
3GPP TSG RAN WG1 #55bis, R1-090415, ZTE, SCH Channels for LTE-A with Carrier Aggregation, Ljubljana Slovenia, Jan. 12-16, 2009.
3GPP TSG RAN WG1 #54bis, R1-083607, ZTE, Spectrum Efficiency for Wider Bandwidth, Prague Czech, Sep. 29-Oct. 4, 2008.
Japan Office Action for related JP application 2011-552313 dated May 14, 2013 (5 pages).
S802.16m-08/364rl, Virtual Multi-Carrier Operation for IEEE 802.16m; Hujun Yin et al.; May 8, 2008 (16 pages).
C802.16m-08/144, Mobility Management with Multi-Carrier Support in IEEE 802.16m; Kelvin Chou et al.; Mar. 10, 200898 pages).
C802.16m-08/335, Proposal for IEEE 802.16m Multi-Carrier Configuration; Ni-Han Fong et al.; May 5, 2008 (9 pages).
The Taiwan IPO, the Search Report of TW application 099105935 dated Sep. 26, 2013 (5 pages).
The SIPO, the Third Examination Opinion of CN application 201080001033.8 dated Aug. 16, 2013 (12 pages).
The Taiwan IPO, Office Action of TW application 099105935 dated Jan. 23, 2015 (5 pages).

* cited by examiner

GLOBAL RF CARRIER CONFIGURATION MESSAGE 20

| FIELD | SIZE (BIT) | DESCRIPTION |
|---|---|---|
| NUMBER OF CARRIER GROUPS | 4 | GROUPS OF ONE OR MORE CONTIGUOUS RF CARRIERS |
| FOR EACH CARRIER GROUP { | | |
| MULTI-CARRIER CONFIGURATION INDEX | 6 | GLOBAL MULTI-CARRIER CONFIGURATION INDEX FOR EACH CARRIER GROUP |
| FREQUENCY ASSIGNMENT INDEX | 6 | FREQUENCY ASSIGNMENT INDEX OF THE FIRST CARRIER IN EACH CARRIER GROUP |
| NUMBER OF CARRIERS | 6 | RF CARRIERS |
| FOR EACH CARRIER { | | |
| PHYSICAL CARRIER INDEX | 6 | INDEX OF THE PHYSICAL RF CARRIER |
| DUPLEX MODE } | 1 | "0" FOR TDD "1" FOR FDD |
| } | | |
| PHYSICAL CARRIER INDEX OF CURRENT CARRIER | 6 | THE PHYSICAL RF CARRIER THAT BROADCASTS THIS MESSAGE |

FIG. 2

CARRIER CONFIGURATION LOOKUP TABLE 30

| MULTI-CARRIER CONFIG INDEX | CARRIER CONFIGURATION (MHz) | FREQUENCY OFFSET (kHz) |
|---|---|---|
| 1 | {5} | {0} |
| 2 | {7} | {0} |
| 3 | {8.75} | {0} |
| 4 | {10} | {0} |
| 5 | {20} | {0} |
| 6 | {10, 10} | {0, -3.1248} |
| 7 | {5, 5, 5, 5} | {0, -1.5629, -3.1248, -4.6867} |

FIG. 3

| MULTI-CARRIER CONFIG INDEX | CARRIER GROUP BW | CARRIER CONFIGURATION (MHz) | REF CARRIER INDEX | FREQUENCY OFFSET (kHz) |
|---|---|---|---|---|
| 1 | 5 | {5} | 1 | {0} |
| 2 | 10 | {10} | 1 | {0} |
| 3 | 10 | {5, 5} | 1 | {0, -1.5629} |
| 4 | 10 | {5, 5} | 2 | {+9.3745, 0} |
| 5 | 15 | {10, 5} | 1 | {0, -7.8127} |
| 6 | 15 | {10, 5} | 2 | {+3.1248, 0} |
| 7 | 15 | {5, 10} | 1 | {0, -7.8127} |
| 8 | 15 | {5, 10} | 2 | {+3.1248, 0} |
| 9 | 15 | {5, 5, 5} | 1 | {0, -1.5629, -3.1248} |
| 10 | 15 | {5, 5, 5} | 2 | {+9.3745, 0, -1.5629} |
| 11 | 15 | {5, 5, 5} | 3 | {+7.8127, +9.3745, 0} |
| 12 | 20 | {20} | 1 | {0} |
| 13 | 20 | {10, 10} | 1 | {0, -3.1248} |
| 14 | 20 | {10, 10} | 2 | {+7.8127, 0} |
| 15 | 20 | {5, 5, 10} | 1 | {0, -1.5629, -9.3745} |
| 16 | 20 | {5, 5, 10} | 2 | {+9.3745, 0, -1.5629} |
| 17 | 20 | {5, 5, 10} | 3 | {+1.5629, +3.1248, 0} |
| 18 | 20 | {5, 10, 5} | 1 | {0, -7.8127, -9.3745} |
| 19 | 20 | {5, 10, 5} | 2 | {3.1248, 0, -7.8127} |
| 20 | 20 | {5, 10, 5} | 3 | {+1.5629, +3.1248, 0} |
| 21 | 20 | {10, 5, 5} | 1 | {0, -7.8127, -9.3745} |
| 22 | 20 | {10, 5, 5} | 2 | {+3.1248, 0, -1.5629} |
| 23 | 20 | {10, 5, 5} | 3 | {+1.5629, +9.3745, 0} |
| 24 | 20 | {5, 5, 5, 5} | 1 | {0, -1.5629, -3.1248, -4.6867} |
| 25 | 20 | {5, 5, 5, 5} | 2 | {+9.3745, 0, -1.5629, -3.1248} |
| 26 | 20 | {5, 5, 5, 5} | 3 | {+7.8127, +9.3745, 0, -1.5629} |
| 27 | 20 | {5, 5, 5, 5} | 4 | {+6.2508, +7.8127, +9.3745, 0} |

CARRIER CONFIGURATION LOOKUP TABLE

FIG. 7

TABLE 748 – AAI_MC-ADV MAC CONTROL MESSAGE

| FIELD | SIZE (BIT) | DESCRIPTION |
|---|---|---|
| MAC CONTROL MESSAGE TYPE | 8 | |
| ⋮ | | |
| FOR EACH SERVING BS CARRIER i { | | |
| PHYSICAL CARRIER INDEX | 6 | PHYSICAL CARRIER INDEX IN AAI_GLOBAL-CONFIG MESSAGE |
| ⋮ | | |
| SFH SUB-PKT | 88 | |
| } | | |

TABLE 881 – S-SFH SP1 IE FORMAT

| SYNTAX | SIZE (BIT) | NOTES |
|---|---|---|
| S-SFH SP1 IE FORMAT { | 8 | |
| ⋮ | | |
| FRAME CONFIGURATION INDEX | 6 | THE MAPPING BETWEEN THE VALUE OF THIS INDEX AND FRAME CONFIGURATION IS LISTED IN TABLE 780 |
| } | | |

TABLE 780 – FRAME CONFIGURATION AND INDEXING

| NO | BW | CP | FRAME CONFIGURATION INDEX | ... | DL OFFSET | ... |
|---|---|---|---|---|---|---|
| 1 | 5/10/20 | 1/16 | 0 | ... | N/A | ... |
| ⋮ | ⋮ | ⋮ | ⋮ | ... | ⋮ | ... |
| 11 | 5/10/20 | 1/8 | 5 | ... | 3 | ... |
| ⋮ | ⋮ | ⋮ | ⋮ | ... | ⋮ | ... |
| 27 | 5/10/20 | 1/4 | 3 | ... | N/A | ... |

FIG. 12

METHOD AND APPARATUS FOR COMMUNICATING CARRIER CONFIGURATION IN MULTI-CARRIER OFDM SYSTEMS

CROSS REFERENCE TO RELATED APPLICATION

This application is a continuation, and claims priority under 35 U.S.C. §120 from nonprovisional U.S. patent application Ser. No. 12/660,441, entitled "Method and Apparatus for Communicating Carrier Configuration in Multi-Carrier OFDM Systems," filed on Feb. 26, 2010, the subject matter of which is incorporated herein by reference. Application Ser. No. 12/660,441, in turn, claims priority under 35 U.S.C. §119 from U.S. Provisional Application No. 61/156,574, entitled "Methods for Configuring Multi-Carrier Transmission in OFDM Multi-Carrier Systems," filed on Mar. 2, 2009; U.S. Provisional Application No. 61/172,344, entitled "Method of Capability Negotiation to Support Prioritized Carrier Assignment in OFDMA Multi-Carrier Systems," filed on Apr. 24, 2009; U.S. Provisional Application No. 61/290,963, entitled "Method of Configuring Multi-Carrier OFDM Systems with Legacy Support," filed on Dec. 30, 2009; the subject matter of which is incorporated herein by reference.

TECHNICAL FIELD

The disclosed embodiments relate generally to multi-carrier wireless communication systems, and, more particularly, to carrier configuration in multi-carrier OFDM systems.

BACKGROUND

In current wireless communications systems, 5 MHz~10 MHz radio bandwidths are typically used for up to 100 Mbps peak transmission rate. Much higher peak transmission rate is required for next generation wireless systems. For example, 1 Gbps peak transmission rate is required by ITU-R for IMT-Advanced systems such as the $4^{th}$ generation ("4G") mobile communications systems. The current transmission technologies, however, are very difficult to perform 100 bps/Hz transmission spectrum efficiency. In the foreseeable next few years, only up to 15 bps/Hz transmission spectrum efficiency can be anticipated. Therefore, much wider radio bandwidths (i.e., at least 40 MHz) will be necessary for next generation wireless communications systems to achieve 1 Gbps peak transmission rate.

Orthogonal Frequency Division Multiplexing (OFDM) is an efficient multiplexing scheme to perform high transmission rate over frequency selective channel without the disturbance from inter-carrier interference. There are two typical architectures to utilize much wider radio bandwidth for OFDM system. In a traditional OFDM system, a single radio frequency (RF) carrier is used to carry one wideband radio signal, and in a multi-carrier OFDM system, multiple RF carriers are used to carry multiple radio signals with narrower bandwidth. A multi-carrier OFDM system has various advantages as compared to a traditional OFDM system such as easier backward compatibility, better reuse on legacy single-carrier hardware design, more mobile station hardware flexibility, and lower Peak to Average Power Ratio (PAPR) for uplink transmission. Thus, multi-carrier OFDM systems have become the baseline system architecture in IEEE 802.16m (i.e. for WiMAX 2.0 system) and 3GPP Release 10 (i.e. for LTE-Advanced system) draft standards to fulfill system requirements.

A multi-carrier OFDM system, however, typically has much more complicated carrier configuration. Carrier configuration generally may include the number of RF carriers, center frequency of each carrier, bandwidth of each carrier, physical index of each carrier, and sub-carrier alignment parameters of adjacent carriers, etc. Because of the complicated carrier configuration, it is difficult for mobile stations to know which RF carriers are supported by which base stations across the entire OFDM network. In current IEEE 802.16e specification, an MOB_NBR-ADV message (neighbor advertisement message) is defined for a base station to broadcast essential bandwidth and frequency information of neighboring cells on a carrier-by-carrier basis. However, such repeated broadcasting for each carrier introduces unnecessary overhead over the air and is inefficient. It thus remains a challenge to communicate global carrier configuration of the multi-carrier OFDM system effectively from base stations to mobile stations.

SUMMARY

A global carrier configuration message is provided in a wireless multi-carrier orthogonal frequency division multiplexing (OFDM) system. The global carrier configuration message contains global carrier configuration information for all available RF carriers in the OFDM network. In one embodiment, the global carrier configuration message comprises the total number of carrier groups available in the OFDM system and information of each carrier group. Each carrier group comprises a group of single or multiple contiguous RF carriers. For each carrier group, the global carrier configuration message also comprises a multi-carrier configuration index, a frequency assignment index, the total number of RF carriers supported in that carrier group, and a physical carrier index for each RF carrier in that carrier group.

In one example, the multi-carrier configuration index refers to carrier configuration information contained in a carrier configuration lookup table. The frequency assignment index refers to a global frequency location contained in a frequency assignment lookup table. Note that the frequency assignment lookup table may also be replaced by pre-defined equation in some examples, this invention use the lookup table as the example to simplify the description. The carrier configuration lookup table also contains frequency offset information for each carrier group. A frequency offset is applied on the center frequencies of RF carriers such that the overlapping sub-carriers between contiguous RF carriers become aligned.

In another example, a mobile station performs scanning and detects radio signals transmitted by a base station over an RF carrier. After network entry procedure, the MS receives a message contains the global carrier configuration transmitted by the BS and obtains global carrier configuration information of the entire network. Based on the carrier configuration information, the MS can perform scanning over other RF carriers efficiently. The MS can also obtain additional information from subsequent messages transmitted by the BS. The subsequent message may use the physical carrier index contained in the global carrier configuration message to identify the bandwidth and center frequency of a particular RF carrier. In another example, the message may explicitly include the parameter to indicate the center frequency of each carrier supported by the network.

In an OFDM network with mixed 3G/4G deployment, both 3G zone and 4G zone may exist in some RF carriers. In one novel aspect, a serving base station transmits a message to a mobile station indicating the frame boundary of other RF carriers supported by the serving base station. For example, a frame offset value is used to indicate the frame boundary of another RF carrier with respect to the frame boundary of the RF carrier over which the serving BS transmits the message to the MS. Upon receiving the message, the MS obtains the frame boundaries in different carriers and consumes less time in scanning.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 2 is a more detailed illustration of a global carrier configuration message.

FIG. 3 illustrates one embodiment of a carrier configuration lookup table that contains carrier configuration information of all possible carrier groups of a wireless multi-carrier OFDM system.

FIG. 7 illustrates another embodiment of a carrier configuration lookup table that contains carrier configuration information of all possible carrier groups in a wireless multi-carrier OFDM system.

FIG. 12 illustrates a method of indicating frame boundary in a multi-carrier OFDM system.

DETAILED DESCRIPTION

Reference will now be made in detail to some embodiments of the invention, examples of which are illustrated in the accompanying drawings.

Figure 1:
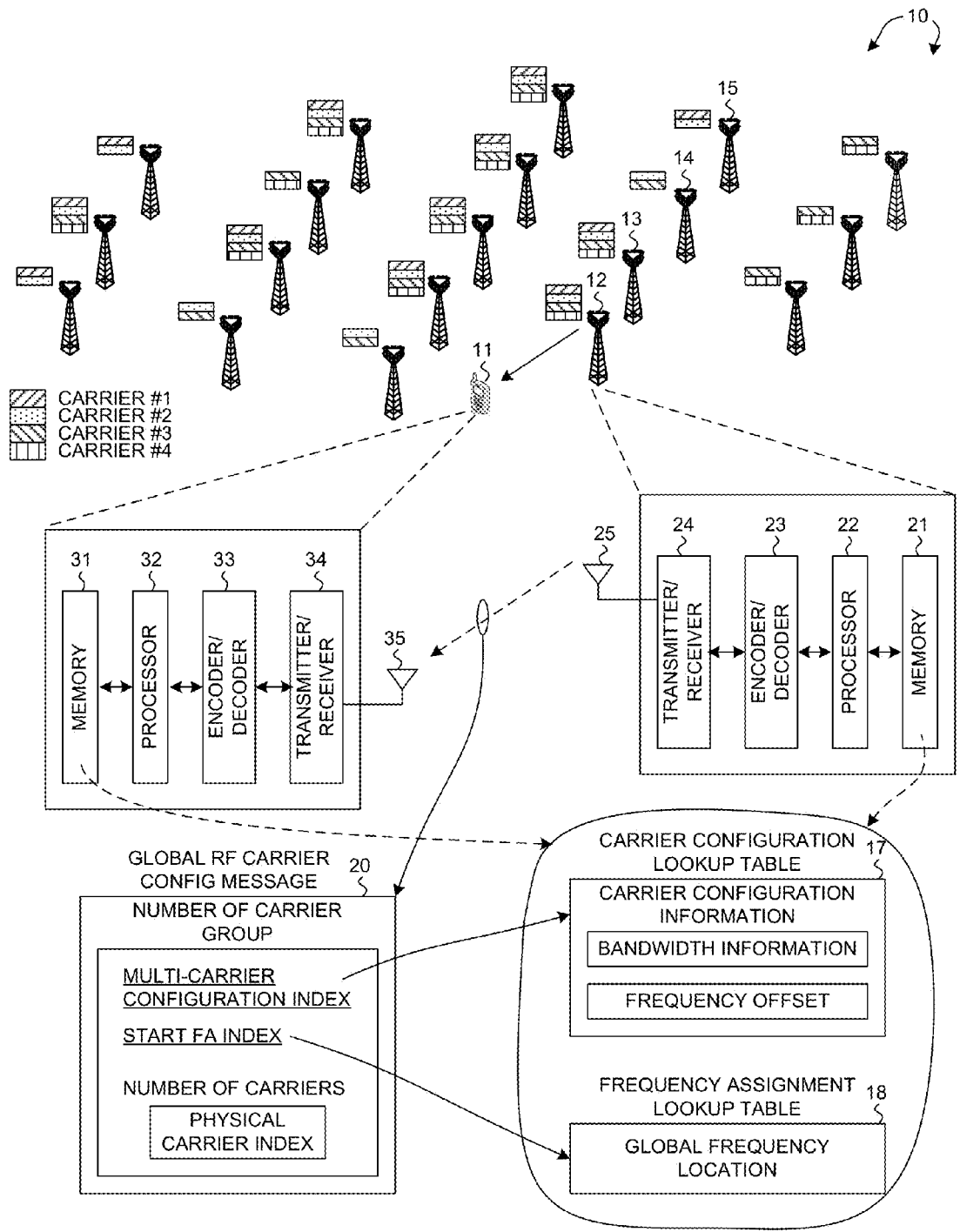
FIG. 1 is a diagram of a wireless multi-carrier OFDM system in accordance with one novel aspect.

FIG. 1 is a diagram of a wireless multi-carrier orthogonal frequency division multiplexing (OFDM) system 10 in accordance with one novel aspect. Multi-carrier OFDM system 10 comprises a plurality of base stations, each of which supports one or multiple radio frequency (RF) carriers. For example, four contiguous RF carriers #1 to #4 are supported in OFDM network 10, BS12 and BS13 support all four RF carriers #1 to #4, BS14 support two RF carriers #2 and #3, and BS15 supports two RF carriers #3 and #4. Each base station comprises a memory 21, a processor 22, an encoder/decoder 23, and a radio frequency (RF) transmitter and receiver 24 coupled to an antenna 25. Similarly, each mobile station (i.e., MS11) comprises a memory 31, a processor 32, an encoder/decoder 33, and a RF transmitter and receiver 34 coupled to an antenna 35. In one novel aspect, each base station broadcasts a message contains global carrier configuration to mobile stations in multi-carrier OFDM system 10. MS11 receives the message contains global carrier configuration, decodes the message and obtains global carrier configuration across the entire multi-carrier OFDM network.

In the example of FIG. 1, global carrier configuration message 20 comprises the total number of carrier groups available in OFDM system 10. Each carrier group comprises a group of one or more contiguous RF carriers. For each carrier group, the global carrier configuration message 20 also comprises a multi-carrier configuration index, a frequency assignment index, the total number of RF carriers supported in that carrier group, and a physical carrier index for each RF carrier in that carrier group. The multi-carrier configuration index for each carrier group serves as an index to a carrier configuration lookup table 17, which contains essential carrier configuration of the corresponding carrier group. Additionally, the frequency assignment index for each carrier group serves as an index to a frequency assignment lookup table 18, which contains global frequency location of a reference RF carrier of the corresponding carrier group. Both carrier configuration lookup table 17 and frequency assignment lookup table 18 are saved in memory 21 of each base station, and can be updated from the base stations onto memory 31 of MS11. Therefore, by broadcasting global carrier configuration message 20, MS11 is able to learn global carrier configuration across the entire OFDM network. Furthermore, by broadcasting indexes instead of the actual carrier configuration and frequency information, better efficiency is achieved.

FIG. 2 is a more detailed illustration of global carrier configuration message 20. As illustrated in FIG. 2, global carrier configuration message 20 contains a 4-bit field indicating the number of available carrier groups. For each carrier group, global carrier configuration message 20 contains a 6-bit field for multi-carrier configuration index, a 6-bit field for frequency assignment index, and a 6-bit field indicating the number of RF carriers. For each RF carrier, global carrier configuration message 20 contains a 6-bit field for physical carrier index, and a 1-bit field for duplex mode (i.e., "0" for TDD and "1" for FDD). Global carrier configuration message 20 also contains a physical carrier index of the current RF carrier that broadcasts this configuration message.

FIG. 3 illustrates one embodiment of a carrier configuration lookup table 30 that contains carrier configuration information of all possible carrier groups in a wireless multi-carrier OFDM system. As illustrated in FIG. 3, there are seven different carrier groups indexed by multi-carrier configuration index (i.e., integer 1 to 7). Each multi-carrier configuration index refers to a corresponding carrier configuration and frequency offset information. For example, OFDM network 10 of FIG. 1 can be configured to have one carrier group with a multi-carrier configuration index 7. Carrier group #7 has a carrier configuration of {5, 5, 5, 5}, representing four contiguous RF carriers having 5 MHz bandwidth each. In addition, carrier group #7 also has a frequency offset of {0, −1.5629, −3.1248, −4.6867}kHz. With more details described below, a frequency offset is to be applied over adjacent RF carriers within each carrier group for sub-carrier alignment operation.

Figure 4:
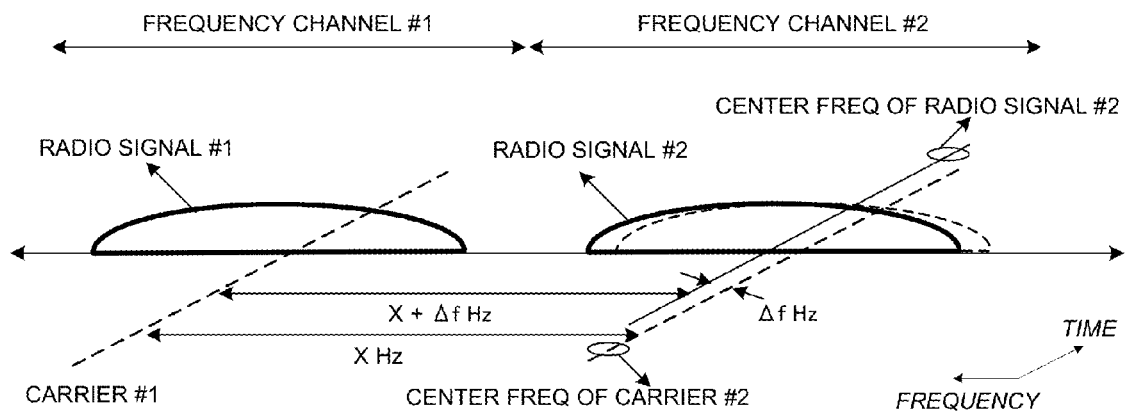
FIG. 4 is a general drawing of two contiguous RF carriers in an OFDM system.

FIG. 4 is a general drawing of two contiguous RF carriers #1 and #2 in OFDM system 10. In an OFDM system, sometimes the center frequency of a radio signal transmitted over each frequency channel of a corresponding RF carrier is not the same as originally defined in the OFDM system. As illustrated in FIG. 4, RF carrier #1 carries radio signal #1 and is transmitted by frequency channel #1, while RF carrier #2 carries radio signal #2 and is transmitted by frequency channel #2. The separation between originally defined center frequencies of each RF carrier is XHz (i.e., 10 MHz), but the center frequency of radio signal #2 is shifted by an offset of ΔfHz such that overlapping sub-carriers between the two contiguous RF carriers are aligned.

Figure 5:
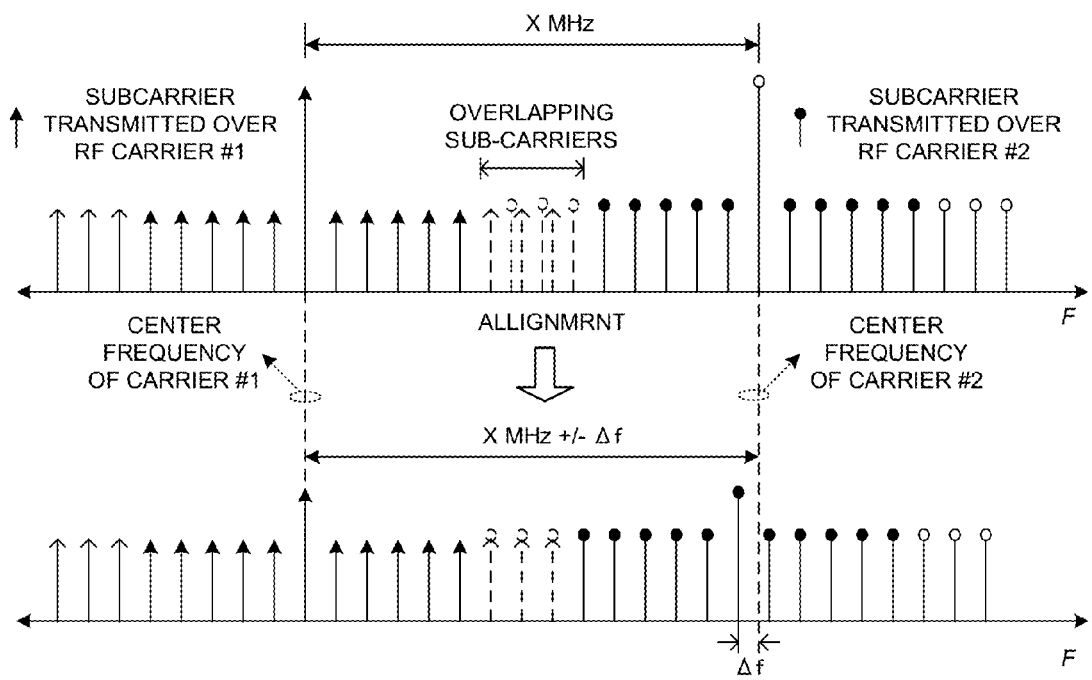
FIG. 5 is a detailed drawing of two contiguous RF carriers in an OFDM system before and after sub-carrier alignment.

FIG. 5 is a detailed drawing of two contiguous RF carriers #1 and #2 in OFDM system 10 before and after sub-carrier alignment. As illustrated in FIG. 5, because of the mismatch between the sub-carrier spacing (e.g., 10.9375 kHz or 15 kHz) and the separation between originally defined center frequencies of each RF carrier (i.e., XMHz=10 MHz), the overlapping sub-carriers between carrier #1 and carrier #2 are not aligned. After sub-carrier alignment, an offset of ΔfHz is applied on the center frequency of carrier #2 such that the overlapping sub-carriers become aligned. Sub-carrier alignment is a fundamental requirement in multi-carrier OFDM systems. This is because sub-carrier alignment allows multi-carrier base stations to generate multiple narrower band radio signals (e.g., 10 MHz waveforms) over different RF carriers using a wideband transceiver (e.g., 40 MHz) with a larger size FFT (e.g., 4096FFT). Such multi-carrier base stations can flexibly serve both single-carrier and multi-carrier mobile stations with different number of supported carriers. In addition, sub-carrier alignment allows data transmission over guard sub-carriers to increase overall system throughput and peak transmission rate.

Because sub-carrier alignment operation affects the center frequencies of adjacent contiguous RF carriers, it is thus desirable to include the associated frequency offset information as part of the carrier configuration information. Referring back to FIG. 3, carrier configuration lookup table 30 contains both carrier configuration information and frequency offset information for each carrier group. By combining the information, the exact center frequency location of an RF carrier X in a carrier group Y can be calculated. For example, carrier group #7 has a carrier configuration of {5, 5, 5, 5}MHz and a frequency offset of {0, −1.5629, −3.1248, −4.6867}kHz. First, the global frequency location of the reference carrier #1 (e.g., xxx MHz) can be identified by the "frequency assignment index" associated with carrier group #7. Next, the center frequency of carrier #3 before sub-carrier alignment can be derived to be (yyy=(xxx+(5+5)/2+(5+5)/2) MHz). The first "(5+5)/2" is the nominal bandwidth of carrier#1 and carrier#2, which means the separation between the center frequencies of carrier#1 and carrier#2 before sub-carrier alignment. Along the same line, the second "(5+5)/2" is the nominal bandwidth of carrier#2 and carrier#3. Finally, the exact center frequency of carrier #3 after sub-carrier alignment can be calculated with further addition of an associated frequency offset value of −3.1248 kHz (e.g., yyy MHz −3.1248 kHz).

It should be noted that, with sub-carrier alignment, the RF carriers in each carrier group are not only contiguous, but also have aligned overlapping sub-carriers. If two adjacent contiguous RF carriers do not have aligned sub-carriers, then they are categorized under different carrier groups.

Figure 6A:
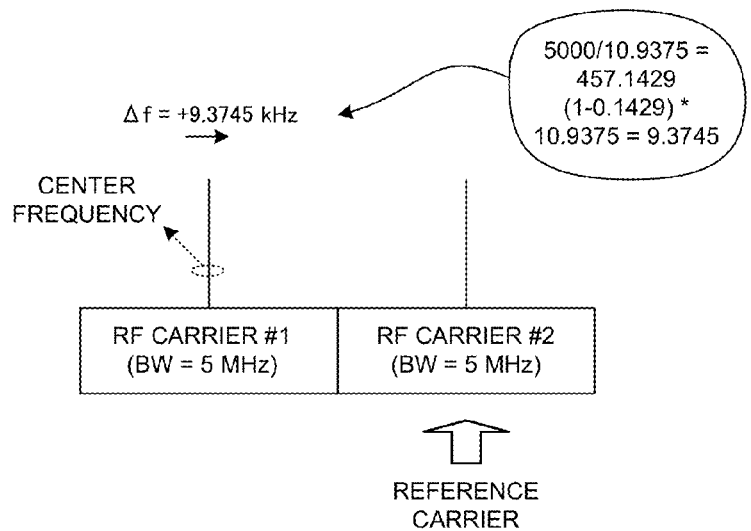
FIGS. 6A and 6B illustrate frequency offset calculation of two contiguous RF carriers with aligned overlapping sub-carriers.
Figure 6B:
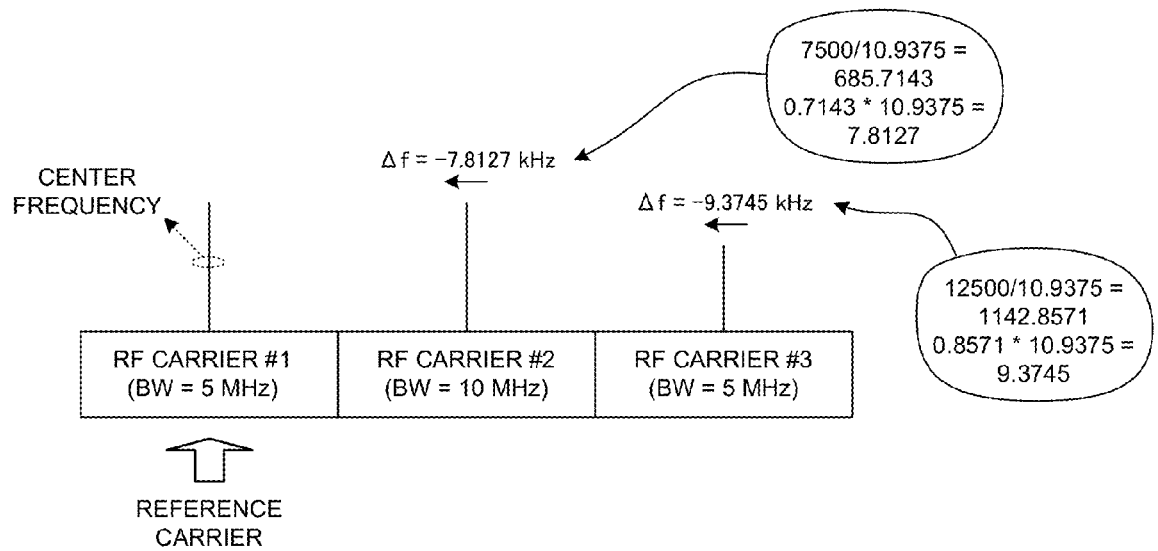

FIGS. 6A and 6B illustrate frequency offset calculation of two contiguous RF carriers with aligned overlapping sub-carriers. Two assumptions are made to calculate the frequency offsets. First, sub-carrier spacing is equal to 10.3975 kHz. Second, the center frequency of an RF carrier is shifted toward the inside direction of the spectrum segment to prevent disturbance on RF spectrum mask after sub-carrier alignment operation. In the example of FIG. 6A, each RF carrier has 5 MHz bandwidth, and RF carrier #2 is the reference carrier. According to the calculation depicted in FIG. 6A, the center frequency of RF carrier #1 is shifted by Δf=9.3745 kHz to achieve sub-carrier alignment. Similarly, in the example of FIG. 6B, each of the contiguous RF carriers has a 5 MHz, 10 MHz and 5 MHz bandwidth respectively, and RF carrier #1 is the reference carrier. According to the calculation depicted in FIG. 6B, the center frequency of RF carrier #2 is shifted by Δf=−7.8217 kHz, and the center frequency of RF carrier #3 is shifted by Δf=−9.3745 kHz to achieve sub-carrier alignment. Thus, the frequency offset calculation for sub-carrier alignment can be calculated in advance based on carrier configuration and sub-carrier spacing applied in each OFDM system. It is thus advantageous to include such information in the carrier configuration lookup table.

FIG. 7 illustrates another embodiment of a carrier configuration lookup table 70 that contains carrier configuration information of all possible carrier groups in a wireless multi-carrier OFDM system. In the example of FIG. 7, twenty-seven carrier groups are defined. Each carrier group is indexed by a multi-carrier configuration index (i.e., integer 1 to 27). For each carrier group, carrier configuration lookup table 70 includes carrier group bandwidth, carrier configuration information, reference carrier index, and frequency offset information. Thus, carrier configuration information of a particular carrier group contained in this carrier configuration lookup table can be referred by a simple integer of multi-carrier configuration index.

Figure 8:
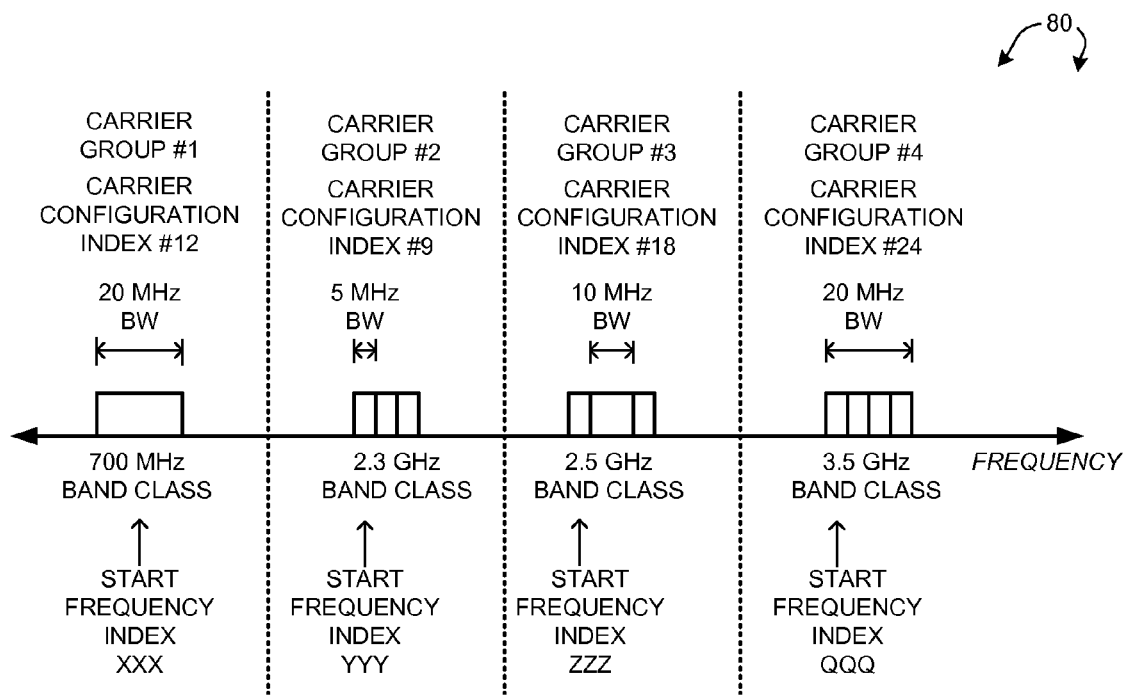
FIG. 8 illustrates a wireless multi-carrier OFDM system having four different carrier groups.

FIG. 8 illustrates a wireless multi-carrier OFDM system 80 having four different carrier groups. OFDM system 80 has a relatively complicated carrier configuration because more number of RF carriers is supported, the bandwidth of each RF carrier is different, and the location of each RF carrier is distributed. In one novel aspect, OFDM system 80 is configured to have four different carrier groups, and each of the carrier groups is associated with a multi-carrier configuration index that refers to carrier configuration lookup table 70 of FIG. 7. For example, a first carrier group #1 has a multi-carrier configuration index 12, which refers to a single RF carrier with 20 MHz bandwidth, a second carrier group #2 has a multi-carrier configuration index 9, which refers to three contiguous RF carriers with {5, 5, 5} carrier configuration and {0, −1.5629, −3.1248} frequency offset, a third carrier group #3 has a multi-carrier configuration index 18, which refers to three contiguous RF carriers with {5, 10, 5} carrier configuration and {0, −1.8127, −9.3745} frequency offset, and a fourth carrier group #4 has a multi-carrier configuration index 24, which refers to four contiguous RF carriers with {5, 5, 5, 5} carrier configuration and {0, −1.5629, −3.1248, −4.6867} frequency offset. In addition, each carrier group is also associated with a frequency assignment index (sometimes also referred as start frequency index) for its exact frequency location. For example, the first carrier group is located in the 700 MHz band class while the third carrier group is located in the 2.5 GHz band class.

Therefore, although OFDM system 80 has a relatively complicated carrier configuration, all the essential carrier configuration information across the entire network can be communicated to the mobile stations via a simple message contains global carrier configuration broadcasted by any base station. The actual carrier configuration and frequency location can be retrieved from the lookup tables saved in the memory of the mobile stations, and the content of the lookup tables can be dynamically updated by sending other messages from any base station. In a traditional OFDM network without the novel global carrier configuration message, a base station needs to broadcast neighboring cell information explicitly, while a mobile station needs to learn the carrier configuration from one cell to another. It consumes much overhead to broadcast carrier configuration for each cell with repeated center frequency and bandwidth information for each carrier, it is also difficult to broadcast those information for all cells including femtocells. From mobile station perspective, it consume the mobile station more time to scanning, as the mobile station needs to scan many possibilities because it does not know which carrier might possibly have signal transmitted from the base station. It can be seen that all the above-illustrated problems in a traditional OFDM network are solved by the broadcasting of the novel global carrier configuration message.

Figure 9:
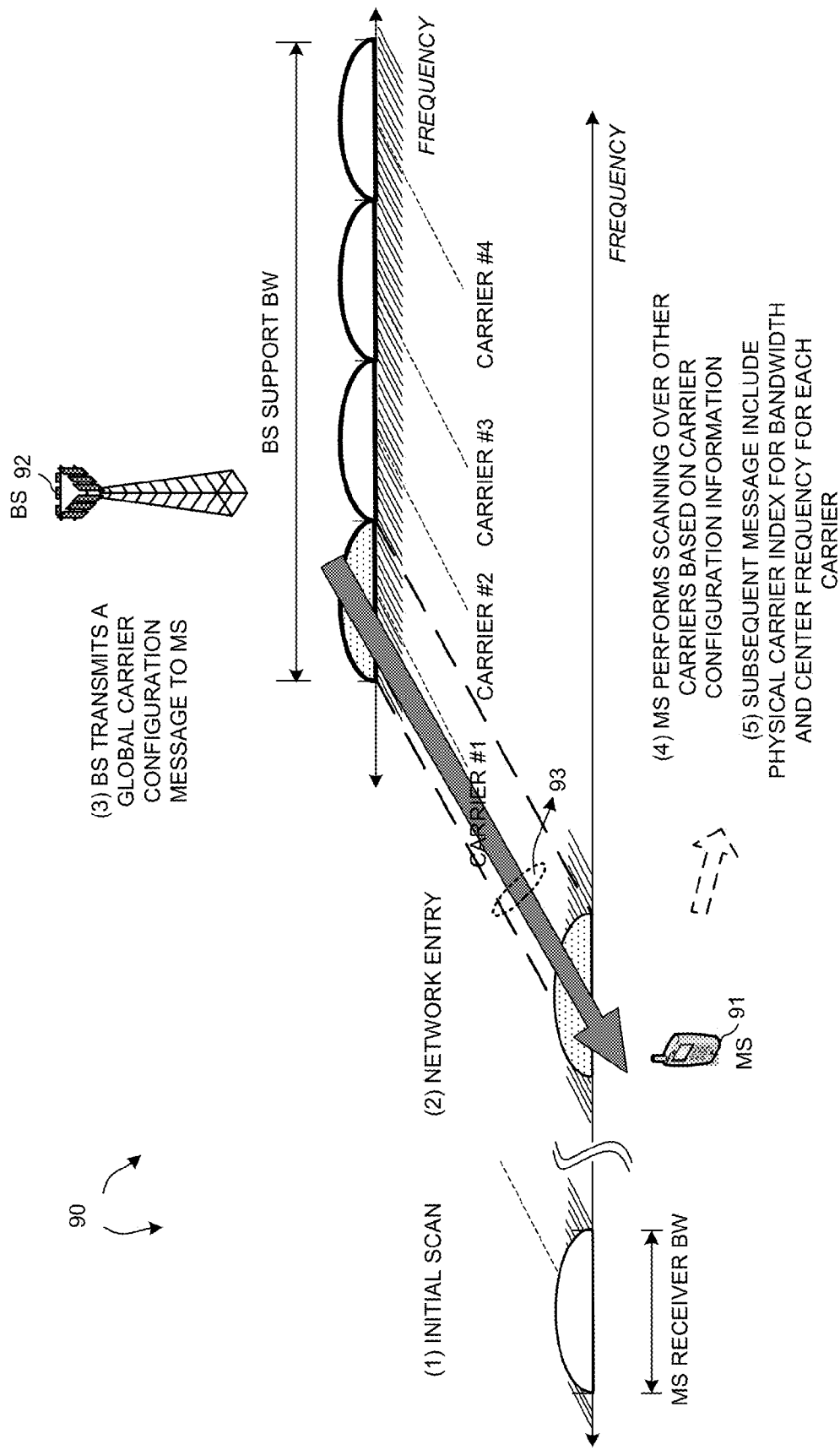
FIG. 9 illustrates a mobile station that receives a global carrier configuration message in a wireless multi-carrier OFDM system.

FIG. 9 illustrates a mobile station that receives a global carrier configuration message in a wireless multi-carrier OFDM system 90. OFDM system 90 comprises a mobile station MS91 and a base station BS92. MS91 has a receiver bandwidth of 5 MHz, while BS92 supports four contiguous RF carriers, and each of the RF carriers has a 5 MHz bandwidth. As illustrated in FIG. 9, MS91 performs initial scanning and detects radio signals transmitted by BS92 over RF carrier #1. After network entry procedure, MS91 receives a global carrier configuration message 93 transmitted by BS92 and obtains carrier configuration information of the entire network. Based on the carrier configuration information, MS91 can perform scanning over other RF carriers efficiently. MS91 can also obtain additional information from subsequent messages transmitted by BS92. The subsequent message may use the physical carrier index contained in global carrier configuration message 93 to identify the bandwidth and center frequency of a particular RF carrier.

Figure 10:
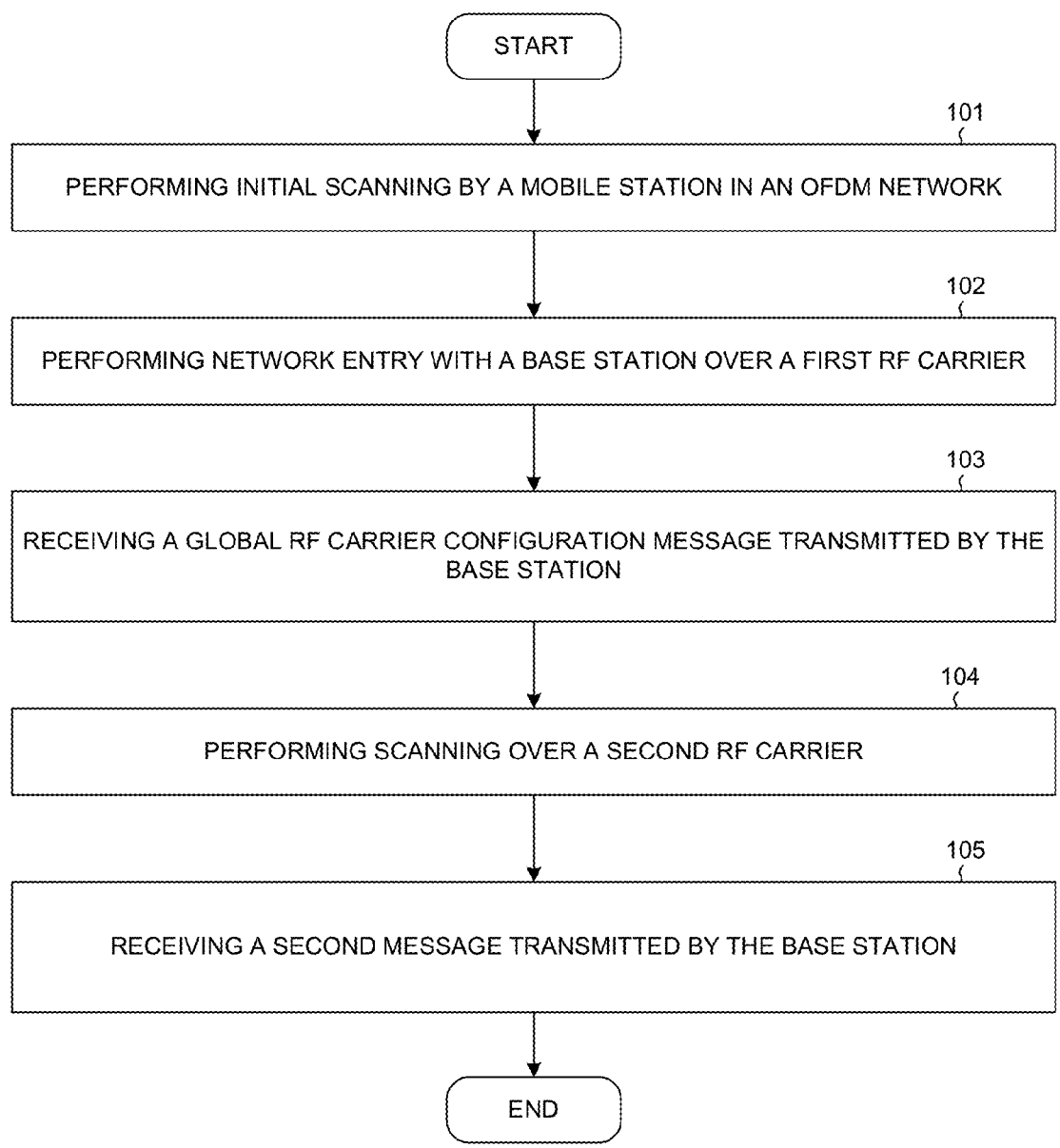
FIG. 10 is a flow chart of a method of transmitting and receiving global carrier configuration message in a wireless multi-carrier OFDM network.

FIG. 10 is a flow chart of a method of transmitting and receiving global carrier configuration message in multi-carrier OFDM system 90. In step 101, MS91 performs initial scanning to search for radio signals transmitted by any base station in OFDM network 90. In another example, MS91 performs handover scanning. Once MS91 detects the first RF carrier (i.e., carrier #1) of BS92, it performs network entry and sets up communication with BS92 (step 102). Right after network entry procedure, BS92 transmits global carrier configuration message 93 to MS91 (step 103). In one example, upon receiving global carrier configuration message 93, a decoder of MS91 decodes the message and thereby obtains a plurality of multi-carrier configuration indexes and frequency assignment indexes for each carrier group. MS91 also obtains the physical carrier index of each RF carrier within each carrier group. MS91 is then able to derive essential carrier configuration information and frequency information of all RF carriers across OFDM network 90. In step 104, MS94 performs scanning over other RF carriers based on the carrier configuration information. Subsequently, MS91 and BS92 continue to exchange other messages that contain additional information for a particular RF carrier (step 105). The subsequent messages may use the physical carrier index to identify the particular RF carrier, and it does not need to contain the detail carrier parameters such as bandwidth and center frequency.

In one embodiment, BS92 transmits a subsequent neighbor advertisement message (i.e., AAI_NBR-ADV) to MS91. The neighbor advertisement message contains additional information such as MAC protocol versions of each RF carrier of a neighboring base station. Because MS91 already learns carrier configuration and physical carrier indexes from global carrier configuration message 93, AAI_NBR-ADV thus no longer needs to carry bandwidth and center frequency, but only the physical carrier index to identify each RF carrier.

While the next generation 4G systems continue to emerge, network deployment takes an evolution path, rather than a revolution one. Therefore, it is foreseeable that mixed 3G/4G zone may coexist in some carriers. The mixed deployment over multiple carriers will result in scanning difficulty for mobile stations because frame boundaries on different carriers may not be aligned in time domain. Mobile stations will consume more scanning effort to obtain the frame boundaries in different carriers.

Figure 11:
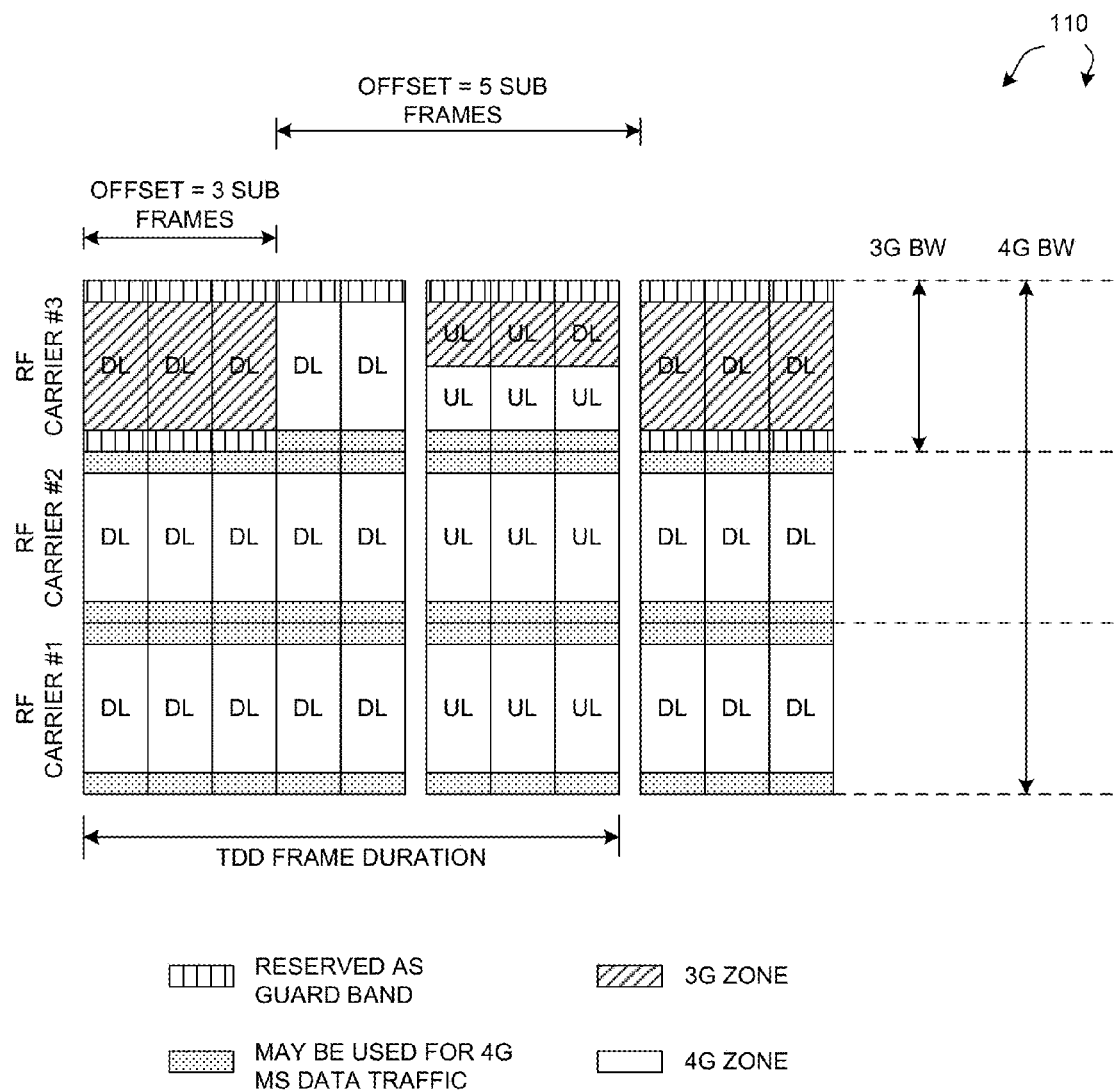
FIG. 11 illustrates a multi-carrier OFDM system that has mixed 3G/4G deployment in accordance with one novel aspect.

FIG. 11 illustrates a multi-carrier OFDM system 110 that has mixed 3G/4G deployment in accordance with one novel aspect. OFDM system 110 supports three RF carriers #1, #2 and #3. RF carriers #1 and #2 are operated in 4G zone, while RF carrier #3 is operated in both 3G and 4G zone. As illustrated in FIG. 11, the frame boundary of 3G zone is not aligned with the frame boundary of 4G zone in time domain. In one novel aspect, when mobile station is connected to a serving base station over one RF carrier, the serving base station transmits a message to the mobile station indicating the frame boundary of other RF carriers supported by the serving base station. In the example of FIG. 11, for RF carrier #1, the serving BS informs the MS that the 4G zone frame boundary of carrier #2 is zero sub-frame offset and the frame boundary of carrier #23 is three sub-frames offset. For RF carrier #2, the serving BS informs the MS that the 4G zone frame boundary of carrier #1 is zero sub-frame offset and the frame boundary of carrier #3 is three sub-frames offset. For RF carrier #3, the serving BS informs the MS that the 4G zone frame boundary of carrier #1 is five sub-frames offset and the frame boundary of carrier #2 is five sub-frames offset.

FIG. 12 illustrates a method of indicating frame boundary in a multi-carrier OFDM system. Assume that a mobile station is connected to its serving base station over RF carrier #1. The serving BS transmits a multi-carrier control message (i.e., AAI_MC-ADV) to the MS over RF carrier #1. In the example of FIG. 12, the multi-carrier control message is defined by table 120 of FIG. 12. It contains super frame header (SFH) sub packet (SUB-PKT) information of each RF carrier of the serving BS. The SFH SUB-PKT in turn is defined by table 121 of FIG. 12. It contains a frame configuration index of a corresponding RF carrier. The frame configuration index further refers to table 122 of FIG. 12, which contains a downlink (DL) frame offset that indicates the frame boundary of the corresponding RF carrier.

The broadcasting techniques described above may be implemented in hardware, software, or a combination thereof. For example, the broadcasting techniques may be implemented with modules (e.g., procedures, functions, etc.) that perform the procedures and functions. The firmware or software codes may be stored in a memory unit (i.e., memory 21 of FIG. 1) and executed by a processor (i.e., processor 22 of FIG. 1).

Although the present invention is described above in connection with certain specific embodiments for instructional purposes, the present invention is not limited thereto. For example, the format of the message contains global carrier configuration may not include a multi-carrier configuration index for a corresponding carrier group. Instead, it may contain other types of format that conveys similar carrier configuration information. For example, it may explicitly include the center frequencies of the carriers supported by the network. Accordingly, various modifications, adaptations, and combinations of various features of the described embodiments can be practiced without departing from the scope of the invention as set forth in the claims.

What is claimed is:

1. A method, comprising:
    performing scanning by a mobile station in an orthogonal frequency division multiplexing (OFDM) network;

receiving a message contains global carrier configuration transmitted by a base station over a first radio frequency (RF) carrier, wherein the global carrier configuration message contains global carrier configuration information of multiple available RF carriers of different base stations in the OFDM network, and wherein each available RF carrier has a unique global physical carrier index; and performing scanning over a second RF carrier, wherein a center frequency of the second RF carrier is derived at least in part based on the received global carrier configuration message.

2. The method of claim 1, wherein the global carrier configuration message contains a multi-carrier configuration index that refers to global carrier configuration information contained in a carrier configuration lookup table.

3. The method of claim 2, wherein the global carrier configuration information comprises bandwidth and frequency offset information, and wherein the frequency offset information is applied on contiguous RF carriers for sub-carrier alignment.

4. The method of claim 1, wherein the global carrier configuration message contains a frequency assignment index that refers to a global frequency location contained in a frequency assignment lookup table.

5. The method of claim 1, further comprising:
receiving a second message transmitted by the base station, wherein the second message contains a physical carrier index of the second RF carrier, and wherein the mobile station obtains additional information of the second RF carrier based on the physical carrier index.

6. A mobile station, comprising:
a receiver that receives a message contains global carrier configuration transmitted from a base station in an orthogonal frequency division multiplexing (OFDM) network, wherein the global carrier configuration message contains global carrier configuration information of multiple available RF carriers of different base stations in the OFDM network, wherein each available RF carrier has a unique global physical carrier index, and wherein the mobile station is connected to the base station over a first RF carrier;
memory that stores the global RF carrier configuration information; and
a multi-carrier decoder that derives a center frequency of a second RF carrier at least in part based on the received global carrier configuration message.

7. The mobile station of claim 6, wherein the global RF carrier configuration information comprises information of single or multiple carrier groups, wherein each carrier group comprises single or multiple contiguous RF carriers, and wherein each carrier group is associated with a multi-carrier configuration index that refers to global carrier configuration information contained in a carrier configuration lookup table and a frequency assignment index that refers to a global frequency location contained in a frequency assignment lookup table.

8. The mobile station of claim 6, wherein the receiver receives a second message transmitted by the base station, wherein the second message contains a physical carrier index of the second RF carrier, and wherein the mobile station obtains additional information of the second RF carrier based on the physical carrier index.

9. A method, comprising:
transmitting a multi-carrier control message from a serving base station to a mobile station in an orthogonal frequency division multiplexing (OFDM) network, wherein the mobile station is connected to the serving base station over a first radio frequency (RF) carrier, wherein the multi-carrier control message is transmitted over the first RF carrier and contains a unique global physical carrier index of a second RF carrier and frame boundary information of the second RF carrier, and wherein the OFDM network is a mixed deployment with overlapping deployment zones, and wherein the first RF carrier and the second RF carrier belong to different deployment in the OFDM network.

10. The method of claim 9, wherein the frame boundary information comprises a frame offset indicating the frame boundary of the second RF carrier with respect to the first RF carrier.

11. The method of claim 9, wherein the frame boundary information refers to super frame header (SFH) information of the second RF carrier, wherein the SFH information comprises a frame configuration index that further refers to a frame offset indicating the frame boundary of the second RF carrier with respect to the first RF carrier.

\* \* \* \* \*